May 19, 1931. F. E. SCHWENTLER 1,805,637
FLUID PRESSURE BRAKE
Filed Feb. 15, 1930
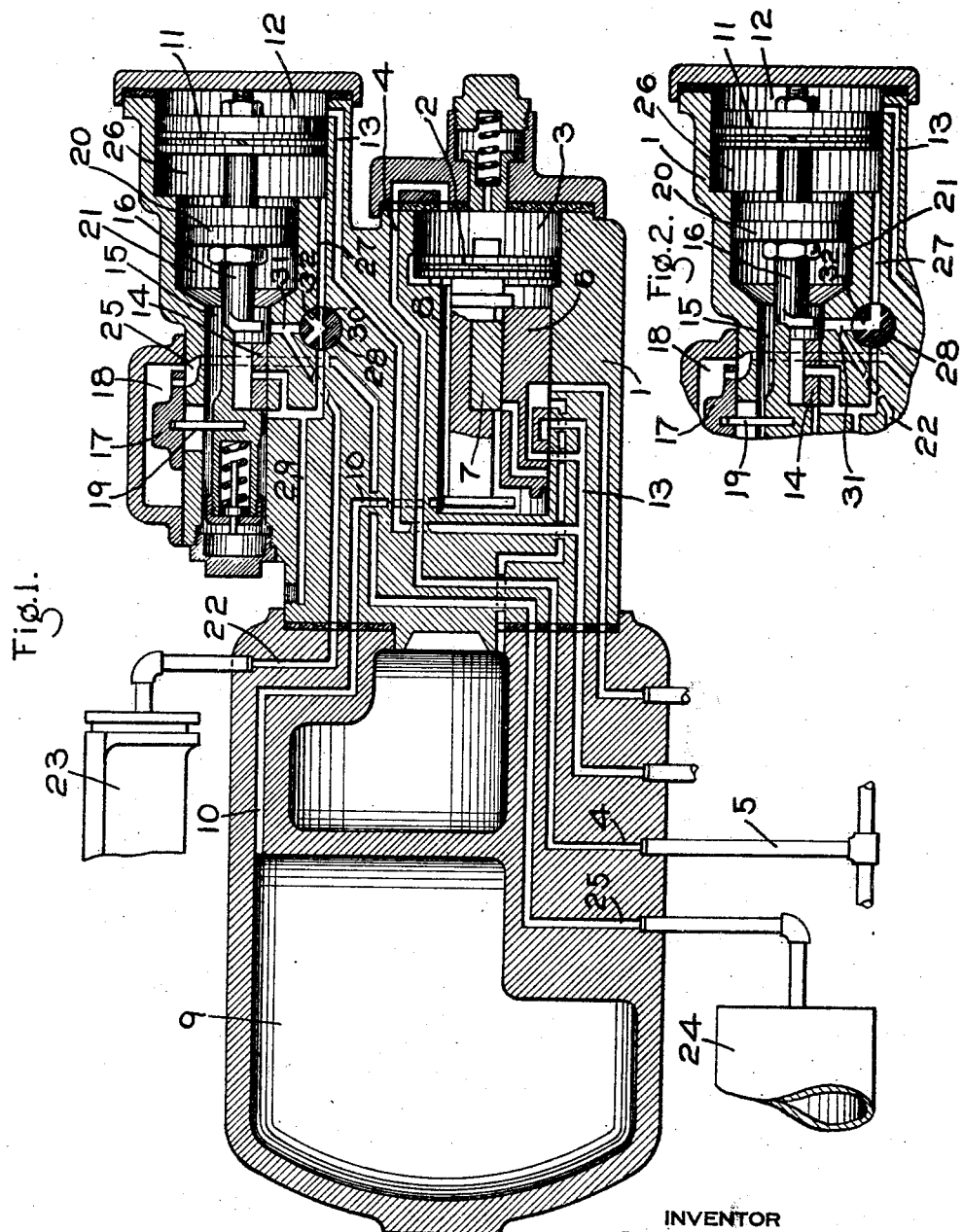
INVENTOR
FRANCIS E. SCHWENTLER.
BY *Wm. M. Cady*
ATTORNEY Patented May 19, 1931

1,805,637

UNITED STATES PATENT OFFICE

FRANCIS E. SCHWENTLER, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 15, 1930. Serial No. 428,555.

This invention relates to automatic fluid pressure brake systems for railway trains, and more particularly to a locomotive fluid pressure brake apparatus.

With the constant development of heavier locomotives, there is a progressive tendency to reduce the space limits available for the application of brake gear and the location of brake cylinders.

The problem of making the reduced space limits answer the requirements may be simplified by employing smaller brake cylinders with correspondingly higher brake cylinder pressures, so that a small brake cylinder with the higher pressure will provide the same braking power as the usual larger brake cylinder with the usual lower pressure.

One object of my invention is to provide a locomotive distributing valve device adapted to supply fluid to the brake cylinders on the locomotive at a higher pressure than usual for a given reduction in brake pipe pressure.

Another object of my invention is to provide means whereby the distributing valve device may be set so as to provide either high or low brake cylinder pressure.

In the accompanying drawings; Figure 1 is a central sectional view of a locomotive distributing valve device, shown diagrammatically, and embodying my invention; and Fig. 2 is a sectional view of a portion of the distributing valve device shown in Fig. 1, with setting cock in the position in which the distributing valve device operates to supply fluid to the brake cylinders at the low normal pressures.

As is usual, the distributing valve device may comprise a casing 1 containing an equalizing portion and an application and release portion. The equalizing portion comprises a piston 2 contained in piston chamber 3, which chamber is connected to the brake pipe 5 through passage 4.

The piston 2 is adapted to operate a main slide valve 6 and a graduating slide valve 7, contained in valve chamber 8, which chamber is connected to the usual pressure chamber 9 through passage 10.

The application and release portion comprises an application piston 11 contained in application cylinder 12, which cylinder is connected to a passage 13, leading to the seat of slide valve 6.

A release slide valve 14, contained in valve chamber 15, is adapted to be operated by piston 11 through piston stem 16, and an application slide valve 17, contained in valve chamber 18, is adapted to be operated by piston stem 16, through a pin 19.

According to my invention, an additional piston 20 is disposed on the stem 16 intermediate the piston 11 and the release valve 14, which piston is contained in cylinder 21. The area of piston 20 is less than the area of piston 11, such as in the ratio of one to two, or such other ratio as may be desired.

The valve chamber 15 is connected to the locomotive brake cylinders through passage 22, the brake cylinders being represented in the drawings by the single brake cylinder 23. The usual main reservoir 24 is connected to valve chamber 18 through passage 25.

The chamber 26, intermediate the pistons 11 and 20, is connected to a passage 27 which is controlled by a manually operable cock 28. In the position of the cock shown in Fig. 1, passage 27 is connected to an atmospheric exhaust passage 29 through a port 30, and in the position shown in Fig. 2, the passage 27 is connected to a passage 31, leading to valve chamber 15, through an L-shaped port 32.

If it is desired to operate at the high brake cylinder pressure, the cock 28 is set to the position shown in Fig. 1, in which chamber 26 is connected to the atmosphere through passage 29. When the brake pipe pressure is reduced to effect a service application of the brakes, the equalizing piston 2 operates the slide valves 6 and 7 in the usual manner to supply fluid under pressure to the application cylinder 12 at a pressure corresponding with the degree of reduction in brake pipe pressure.

The application piston 11 is then operated to shift the release valve 14, so as to cut off the exhaust port 29 from valve chamber 15 and the brake cylinder 23 and to shift the supply valve 17, so that fluid from the main reservoir 24 is supplied to valve chamber 15. When the pressure in valve chamber 15 and the brake cylinder 23 has been increased to a degree, such that the fluid pressure acting on the area of the small piston 20 slightly exceeds the fluid pressure acting on the large piston 11 in cylinder 12, the pistons will be moved toward the right, so as to cut off the further supply of fluid to the brake cylinder.

If the area of piston 20 is one-half the area of piston 11, then the pressure in valve chamber 15 and in the brake cylinder necessary to overcome the pressure of fluid acting in cylinder 12 on piston 11, will be substantially double the pressure acting in cylinder 12. Consequently, if the pressure of fluid in cylinder 12 is 10 pounds, for example, the counterbalancing pressure in valve chamber 15 would be 20 pounds.

If it is desired that the distributing valve device operate under the normal standard conditions as to brake cylinder pressure such as after repairs, in case the distributing valve device is applied to a locomotive equipped with the usual standard brake cylinders instead of high power brake cylinders, then the cock 28 is turned to the position shown in Fig. 2, in which the chamber 26 is connected to the valve chamber 15. The fluid pressures on opposite sides of the piston 20 are then maintained equal at all times, so that the piston 20 has no effect in determining the degree of brake cylinder pressure, the effective piston being the piston 11.

In making applications of the brakes with the cock 28 set in the position shown in Fig. 2, the degree of pressure obtained in the brake cylinder will substantially equal the degree of pressure of fluid supplied to cylinder 12.

While one illustrative embodiment of my invention has been described in detail, it is not my intention to limit its scope to that embodiment or otherwise than by the terms of the appended claims.

Having now described my invention, what I claim as new and desire to secure by Letters Patent, is:

1. In a fluid pressure brake, a brake cylinder, a distributing valve device comprising a valve for controlling the supply of fluid under pressure to the brake cylinder, an application chamber, a differential piston for actuating said valve and having one piston head subject to the pressure of the application chamber and the other piston head subject to brake cylinder pressure, means for connecting the chamber intermediate said piston heads either to the atmosphere or to the brake cylinder, and means for supplying fluid under pressure to the application chamber.

2. In a fluid pressure brake, a brake cylinder, a distributing valve device comprising a valve for controlling the supply of fluid under pressure to the brake cylinder, an application chamber, a differential piston for actuating said valve and having two piston heads, one piston head being subject to the fluid pressure of the application chamber and the other head to brake cylinder pressure, manually operable means for connecting the chamber intermediate said heads either to the atmosphere or to the brake cylinder, and means for supplying fluid under pressure to the application chamber.

3. In a fluid pressure brake, a brake cylinder, a distributing valve device comprising a valve for controlling the supply of fluid under pressure to the brake cylinder, an application chamber, a differential piston for actuating said valves and having two piston heads, one piston head being subject to the fluid pressure of the application chamber and the other head to brake cylinder pressure, a manually operated cock having a port adapted in one position of the cock to connect the chamber intermediate said heads with the atmosphere and having a port adapted in another position of the cock to connect said intermediate chamber with the brake cylinder, and means for supplying fluid under pressure to the application chamber.

In testimony whereof I have hereunto set my hand, this 8th day of February, 1930.

FRANCIS E. SCHWENTLER.